US009781493B2

(12) United States Patent
Takeuchi et al.

(10) Patent No.: US 9,781,493 B2
(45) Date of Patent: Oct. 3, 2017

(54) PATCH PANEL TRAY ASSEMBLY (71) Applicant: Go!Foton Holdings, Inc., Somerset, NJ (US)

(72) Inventors: Kenichiro Takeuchi, North Brunswick, NJ (US); Haiguang Lu, Los Altos, CA (US)

(73) Assignee: Go!Foton Holding, Inc., Somerset, NJ (US)

( * ) Notice: Subject to any disclaimer, the term of this patent is extended or adjusted under 35 U.S.C. 154(b) by 0 days.

(21) Appl. No.: 15/134,876

(22) Filed: Apr. 21, 2016

(65) Prior Publication Data

US 2016/0234571 A1 Aug. 11, 2016

Related U.S. Application Data

(63) Continuation of application No. 14/289,812, filed on May 29, 2014, now Pat. No. 9,344,776.
(Continued)

(51) Int. Cl.
*G02B 6/00* (2006.01)
*H04Q 1/06* (2006.01)
(Continued)

(52) U.S. Cl.
CPC ............. *H04Q 1/066* (2013.01); *A47B 81/00* (2013.01); *A47B 88/437* (2017.01); *A47B 96/02* (2013.01);
(Continued)

(58) Field of Classification Search
None
See application file for complete search history.

(56) References Cited

U.S. PATENT DOCUMENTS 2,865,979 A 12/1958 Klassen
4,353,518 A 10/1982 Taylor et al.
(Continued)

FOREIGN PATENT DOCUMENTS

EP 0207926 A2 1/1987
EP 0795935 A2 9/1997

OTHER PUBLICATIONS

Partial International Search Report for Application No. PCT/US2013/023176 dated May 2, 2013.
(Continued)

*Primary Examiner* — Sung Pak
(74) *Attorney, Agent, or Firm* — Lerner, David, Littenberg, Krumholz & Mentlik, LLP (57) ABSTRACT

A device and a system may facilitate access to communication connectors, adapters, and/or ports that are supported within a housing, e.g., a rack or cabinet. The system may include one or more of the devices. Each device may include a tray having a proximal portion pivotably coupled to a distal portion, the proximal portion including a lip extending at an oblique angle away from the tray. A plurality of arms may be pivotably attached to the distal portion of the tray. A plurality of cable attachment members may be coupled to the plurality of arms. A plate may be attached to a bottom surface of the tray, a proximal portion of the plate including a lip extending along a bottom portion of the proximal lip of the tray, and a distal portion including a lip extending at an oblique angle away from the distal portion of the tray.

20 Claims, 11 Drawing Sheets

Related U.S. Application Data (60) Provisional application No. 61/828,358, filed on May 29, 2013, provisional application No. 61/859,987, filed on Jul. 30, 2013.

(51) Int. Cl.

| | |
|---|---|
| *A47B 81/00* | (2006.01) |
| *A47B 96/02* | (2006.01) |
| *G02B 6/44* | (2006.01) |
| *H04Q 1/02* | (2006.01) |
| *A47B 88/437* | (2017.01) |

(52) U.S. Cl.
CPC ............... *G02B 6/444* (2013.01); *H04Q 1/06* (2013.01); *H04Q 1/13* (2013.01); *A47B 2200/0084* (2013.01)

(56) References Cited

U.S. PATENT DOCUMENTS

| | | | |
|---|---|---|---|
| 4,688,885 A | 8/1987 | Poteat et al. | |
| 5,100,221 A | 3/1992 | Carney et al. | |
| 5,613,021 A | 3/1997 | Saito et al. | |
| 5,775,755 A | 7/1998 | Covert et al. | |
| 6,070,742 A | 6/2000 | McAnally et al. | |
| 6,263,141 B1 | 7/2001 | Smith | |
| 6,293,707 B1 | 9/2001 | Wild | |
| 6,327,139 B1 | 12/2001 | Champion et al. | |
| 6,356,697 B1 | 3/2002 | Braga et al. | |
| 6,442,030 B1 | 8/2002 | Mammoser et al. | |
| 6,556,763 B1 | 4/2003 | Puetz et al. | |
| 6,902,069 B2 | 6/2005 | Hartman et al. | |
| 6,925,241 B2 | 8/2005 | Bohle et al. | |
| 7,198,409 B2 | 4/2007 | Smith et al. | |
| 7,233,731 B2 | 6/2007 | Solheid et al. | |
| 7,335,056 B1 | 2/2008 | Clark et al. | |
| 7,352,945 B2 | 4/2008 | Holmberg et al. | |
| 7,397,997 B2 | 7/2008 | Ferris et al. | |
| 7,460,758 B2 | 12/2008 | Xin | |
| 7,746,667 B1 | 6/2010 | Baiza et al. | |
| 7,809,233 B2 | 10/2010 | Smith et al. | |
| 7,809,234 B2 | 10/2010 | Smith et al. | |
| 7,816,602 B2 | 10/2010 | Landry et al. | |
| RE42,258 E | 3/2011 | Thompson et al. | |
| 8,068,715 B2 | 11/2011 | Kewitsch | |
| 8,175,425 B2 | 5/2012 | Chen | |
| 8,179,684 B2 | 5/2012 | Smrha et al. | |
| 8,263,861 B2 | 9/2012 | Landry et al. | |
| 8,705,929 B2 | 4/2014 | Kowalczyk et al. | |
| 8,731,361 B2 | 5/2014 | Anderson et al. | |
| 8,811,791 B2 | 8/2014 | Solheid et al. | |
| 8,861,918 B2 * | 10/2014 | Vazquez | G02B 6/4455 385/135 |
| 8,938,147 B2 | 1/2015 | Krampotich et al. | |
| 8,939,792 B2 | 1/2015 | Takeuchi et al. | |
| 9,122,021 B2 | 9/2015 | Elenbaas et al. | |
| 9,201,206 B2 | 12/2015 | Smith et al. | |
| 2002/0117942 A1 | 8/2002 | Audibert et al. | |
| 2004/0074852 A1 | 4/2004 | Knudsen et al. | |
| 2004/0178312 A1 | 9/2004 | Parsons | |
| 2005/0111809 A1 | 5/2005 | Giraud et al. | |
| 2006/0018622 A1 | 1/2006 | Caveney et al. | |
| 2006/0162948 A1 | 7/2006 | Rinderer et al. | |
| 2007/0096606 A1 | 5/2007 | Ryu | |
| 2007/0189692 A1 | 8/2007 | Zimmel et al. | |
| 2007/0230889 A1 | 10/2007 | Sato et al. | |
| 2008/0002937 A1 | 1/2008 | Spisany et al. | |
| 2008/0205843 A1 | 8/2008 | Castonguay et al. | |
| 2009/0067800 A1 * | 3/2009 | Vazquez | G02B 6/4455 385/135 |
| 2009/0078834 A1 | 3/2009 | Chen et al. | |
| 2009/0086441 A1 | 4/2009 | Randall et al. | |
| 2009/0238533 A1 | 9/2009 | Stansbury et al. | |
| 2010/0008623 A2 | 1/2010 | Arol et al. | |
| 2010/0054659 A1 | 3/2010 | Pnini et al. | |
| 2010/0220964 A1 | 9/2010 | de Jong et al. | |
| 2010/0248535 A1 | 9/2010 | Chern et al. | |
| 2010/0310221 A1 | 12/2010 | Le Dissez | |
| 2010/0310225 A1 | 12/2010 | Anderson et al. | |
| 2011/0116757 A1 | 5/2011 | Vanmeulen et al. | |
| 2011/0267794 A1 | 11/2011 | Anderson et al. | |
| 2011/0317971 A1 | 12/2011 | Zhang et al. | |
| 2012/0019117 A1 | 1/2012 | Dunwoody et al. | |
| 2012/0321255 A1 | 12/2012 | Kewitsch | |
| 2013/0196538 A1 | 8/2013 | Takeuchi et al. | |
| 2014/0248028 A1 | 9/2014 | Campbell et al. | |
| 2014/0262487 A1 | 9/2014 | Takeuchi et al. | |
| 2014/0348481 A1 | 11/2014 | Giraud et al. | |
| 2014/0354131 A1 | 12/2014 | Takeuchi et al. | |
| 2014/0355217 A1 | 12/2014 | Takeuchi et al. | |
| 2014/0357118 A1 | 12/2014 | Takeuchi et al. | |
| 2015/0253529 A1 | 9/2015 | Lu et al. | |
| 2015/0268436 A1 | 9/2015 | Blackwell, Jr. et al. | |
| 2015/0301298 A1 | 10/2015 | Frith et al. | |
| 2016/0047999 A1 | 2/2016 | Alexi et al. | |

OTHER PUBLICATIONS

International Search Report for Application No. PCT/US2013/023176 dated Jun. 27, 2013.
Partial International Search Report for Application No. PCT/US2013/033701 dated Jul. 11, 2013.
International Search Report and Written Opinion for Application No. PCT/US2013/033701 dated Sep. 2, 2013.
International Search Report and Written Opinion for Application No. PCT/US2014/021953 dated Jun. 25, 2014.

* cited by examiner

PATCH PANEL TRAY ASSEMBLY

CROSS-REFERENCE TO RELATED APPLICATIONS

The present application is a continuation of U.S. patent application Ser. No. 14/289,812, filed May 29, 2014, which claims the benefit of the filing dates of U.S. Provisional Patent Application No. 61/828,358 filed May 29, 2013, and U.S. Provisional Patent Application No. 61/859,987 filed Jul. 30, 2013, the disclosures of which are all hereby incorporated by reference herein.

BACKGROUND OF THE DISCLOSURE

The present disclosure generally relates to a device and a system for supporting and managing communication connectors, adapters, and/or ports. More particularly, the present disclosure relates to communication patch panel devices and systems, which facilitate access to communication connectors, adapters, and/or ports supported by the devices and systems.

In communications cabinets and racks, a multitude of cables are interconnected to one another through connectors, e.g., adapters. A cable organization unit typically has a tray or a shelf or a similar platform, which supports the connectors, e.g., adapters. Examples of cable organization units include patch panels.

A patch panel houses cable connectors and in the majority of cases is rack mounted. The patch panel typically is two-sided; the front of the patch panel provides for connections to relatively short wires or cables, and the rear of the patch panel usually provides for connection to relatively long wires or cables. This setup facilitates the performance of temporary alterations to the front of the patch panel without disturbing the connections in the rear. Sometimes, the cables connected to the front of the patch panel may interconnect different patch panels and may be relatively short or may be part of longer cables. The patch panel facilitates interconnecting, monitoring, and circuit testing of equipment without necessitating costly switching equipment.

Early applications for patch panels were for telephone exchanges, where they are still used albeit in a more automated form. Patch panels are also used extensively in the entertainment industry, e.g., in recording and television studios. They are also used in concert halls to manage connections among equipment, e.g., microphones, speakers, and other electronic equipment. Patch panels are valued for such purposes not only for their convenience and relative cost effectiveness, but also because they make it easier to identify problems such as feedback, ground loops, and static.

Traditional fiber optic cable organization units include fiber optic shelves having a single patch panel or multiple modular panels on the front patching side of the shelf. It is desirable to provide patch panels having increased connector port density, i.e., the number of locations or ports per unit volume of area for providing connections. To this end, smaller sized connectors are increasingly being utilized.

A variety of optical fiber connectors are available, with the Subscriber Connector (SC) and the Lucent Connector (LC) being the most common. The differences among the types of connectors include dimensions and methods of mechanical coupling. For instance, SC connectors use a round 2.5 mm ferrule to hold a single fiber and use a push-on/pull-off mating mechanism. The ferrule of an LC connector is half the size as that of an SC connector, measuring only 1.25 mm. LC connectors use a retaining tab mechanism, which is similar to that found on a household phone connector.

In data communication and telecommunication applications, small connectors, e.g., LC, are increasingly replacing traditional connectors, e.g., SC. The main advantage of small connectors over larger sized connectors is the ability to provide a higher number of fibers per unit of rack space. Since the LC connector is roughly half the size as the SC connector, the placement of almost twice the number of connectors is possible within the same amount of space by using the LC connector instead of the SC connector.

However, there are disadvantages associated with using smaller connectors. As more connectors are placed within the same amount of space, accessing the connectors which is often performed by hand may present a challenge. Adult fingers typically have a diameter of 16 mm to 20 mm. Some people may have larger or misshapen fingers. Therefore, the use of small connectors, such as the LC having a 1.25 mm diameter ferrule, may be especially problematic for technicians having larger or less dexterous hands. Commonly, LC connectors are held together in a duplex configuration with a plastic clip. While holding smaller sized connectors in a duplex configuration may make it easier for a technician to access and/or remove LC connectors, it also means that two connectors are necessarily affected by any given servicing procedure.

There is a continuing need for new devices and systems to facilitate access communication adapters and/or cables supported by communication patching devices and systems.

BRIEF SUMMARY

The present disclosure is generally related to communication patch panels and communication patching systems. In particular, the present disclosure is related to patch panels that facilitate both the placement of multiple, relatively small connectors in close proximity to each other and the manipulation and/or maintenance of those connectors.

According to one embodiment of the disclosure, a communication patch panel device includes a tray having a proximal portion and a distal portion coupled to the proximal portion, the proximal portion including a lip extending at an oblique angle away from the proximal portion of the tray. The device may include a plurality of arms, each arm having a first end pivotably attached to the distal portion of the tray and a second end positioned over the proximal portion of the tray. A plurality of attachment members may be coupled to the plurality of arms, each attachment member configured to attach to a cable. The device may also include a plate having a proximal portion, a distal portion, and being attached to a bottom surface of the tray, the proximal portion of the plate including a lip extending along a bottom portion of the proximal lip of the tray, and the distal portion including a lip extending at an oblique angle away from the distal portion of the tray.

According to another embodiment of the disclosure, a communication patch panel device includes a tray having a proximal portion and a distal portion coupled to the proximal portion. The device may also include a plurality of arms, each arm having a first end pivotably attached to the distal portion of the tray and a second end positioned over the proximal portion of the tray. A plurality of attachment members may be coupled to the plurality of arms, each attachment member configured to attach to a cable. The device may also include a plate having a proximal portion and a distal portion, the proximal portion of the plate being attached to a bottom surface of the proximal portion of the tray, and the distal portion of the plate being attached to a bottom surface of the distal portion of the tray.

According to a further embodiment of the disclosure, a communication patch panel device may include a tray having a proximal portion coupled to a distal portion, the proximal portion including a lip extending at an oblique angle away from the proximal portion of the tray and an opening extending at least partially along the proximal portion. The device may also include a plurality of arms, each arm having a first end pivotably attached to the distal portion of the tray and a second end positioned over the proximal portion of the tray. A plurality of attachment members may be coupled to the plurality of arms, each attachment member configured to attach to a cable and being at least partially positioned within the opening of the tray. The device may further include a plate attached to a bottom portion of the tray and covering the opening in the tray. A proximal lip may extend at an oblique angle away from the proximal portion of the tray.

These and other features of the present disclosure will be more fully described with reference to the accompanying figures.

BRIEF DESCRIPTION OF THE DRAWINGS

By way of description only, embodiments of the present disclosure will be described herein with reference to the accompanying drawings, in which.

DETAILED DESCRIPTION

Particular embodiments of the present disclosure are described with reference to the accompanying drawings. In the figures and in the description that follow, in which like reference numerals identify similar or identical elements, the term "proximal" refers to the end of the device that is closest to the operator or user during use, while the term "distal" refers to the end of the device that is farther from the operator or user during use.

Figures 1A, 1B:
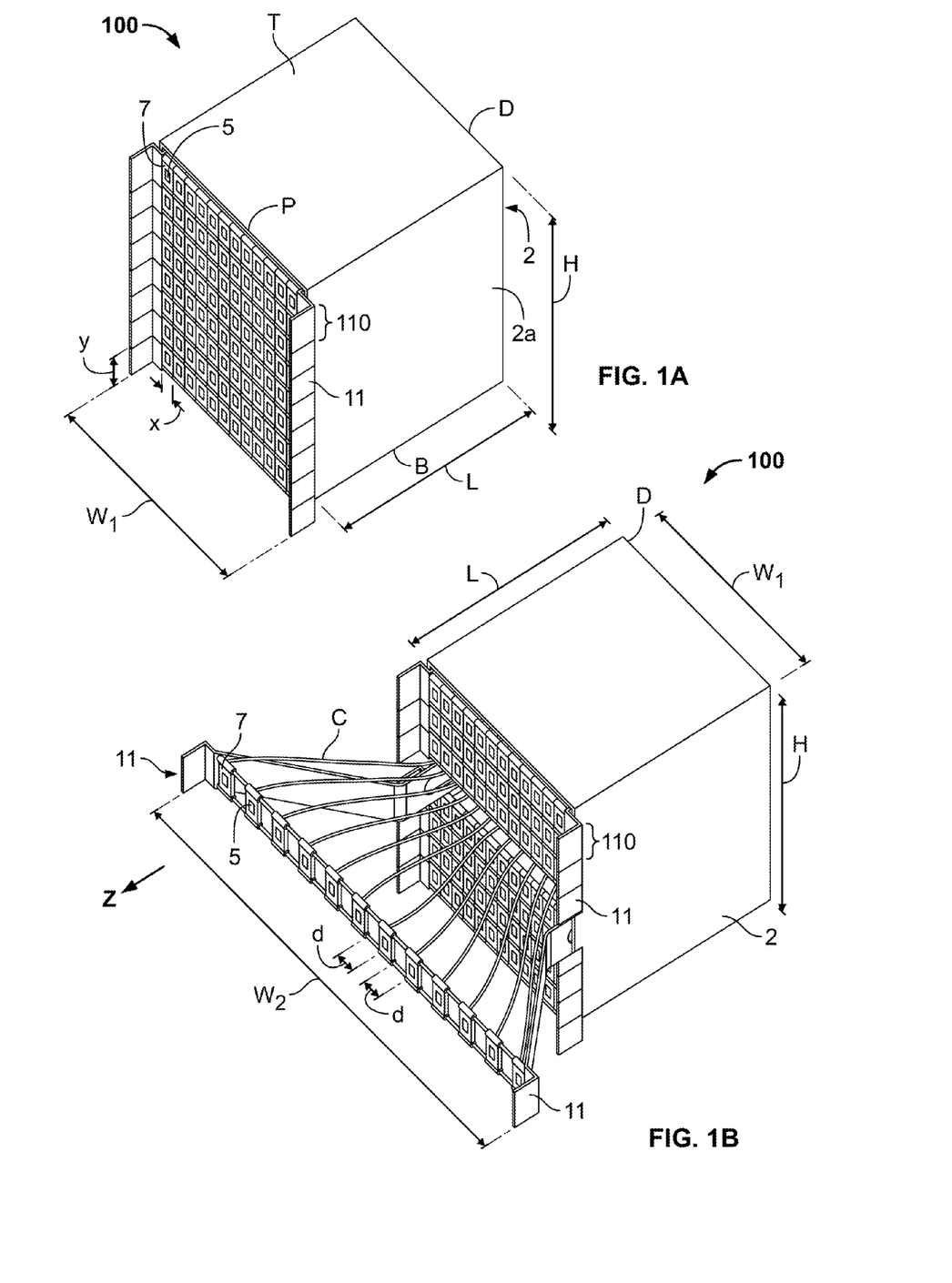
FIG. 1A is a front perspective view of a communication patching system including multiple patch panel devices shown in a first state.
FIG. 1B is the communication patching system of FIG. 1A shown in a second state.
Figure 1C:
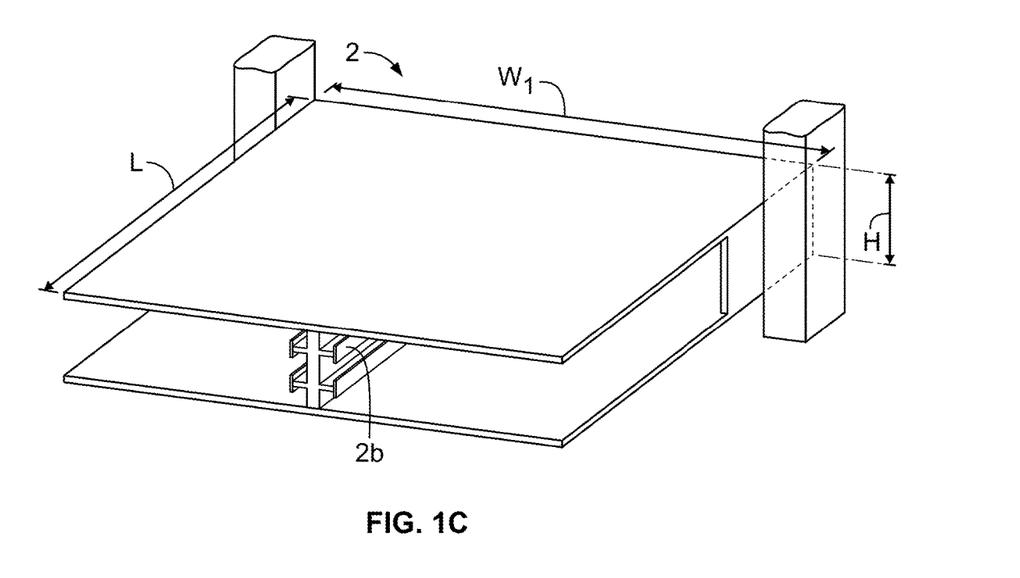
FIG. 1C is a front perspective view of a housing and rack pole, without a patch panel device placed therein.

Now referring to FIGS. 1A-C, a communication patching system 100 may include a housing 2, e.g., a rack or a cabinet. The housing 2 may define a length L, a height H, and a width $W_1$. The housing 2 may support one or more patch panel devices 110, with each device 110 held in vertical alignment with a guide rail 2b (FIG. 1C), a plurality of which may also be disposed in vertical alignment along at least one side of the housing 2.

Each patch panel device 110 may include a plurality of adapters or ports 7, each port 7 having a receptacle 5 for securing a cable C (FIG. 1B) therein. The receptacle 5 of the port 7 may be operatively coupled to one or more cables C, e.g., the receptacle 5 may be in a simplex or in a duplex configuration. The port 7 may include a mounting portion 51 that frames the port 7 and facilitates securing of the port 7, or the receptacle 5, to connection means, e.g., rails 41, 43 (FIG. 2C). In some embodiments, the mounting portion 51 of the port 7 may be integrally formed with the port 7 or may be a separate component coupled to the receptacle 5, and in some embodiments the mounting portion 51 may form a part of a connection means to which the receptacle 5 is connected, as described below.

The patch panel device 110 may include a tab 11 on either end of the patch panel device 110 to facilitate a user grasping or handling of the patch panel device 110. The density of the number of ports 7 supported by the housing 2 may be a function of the dimensions of the housing 2. As shown in FIG. 1A, the ports 7, each of which has a width x and a height y, may be arranged in rows and columns in which the number of rows of ports 7 is directly correlated to the height H and the number of columns of ports 7 is directly correlated to the width $W_1$.

The communication patching system 100 may be transitionable between a first state (FIG. 1A) and a second state (FIG. 1B). In the first state, the one or more patch panel devices 110 may be positioned at a first location with respect to the proximal end or face P of the housing 2. As shown in FIG. 1A, the patch panel devices 110 may be substantially flush with respect to the face P of the housing 2. In the second state, one or more of the patch panel devices 110 may be moved proximally in the direction of arrow Z away from the proximal end or face P of the housing 2. As the patch panel device 110 is moved proximally, the ports 7 may be transitioned to be spaced apart from one another by a gap or spacing distance d (FIG. 1B).

Figure 2A:
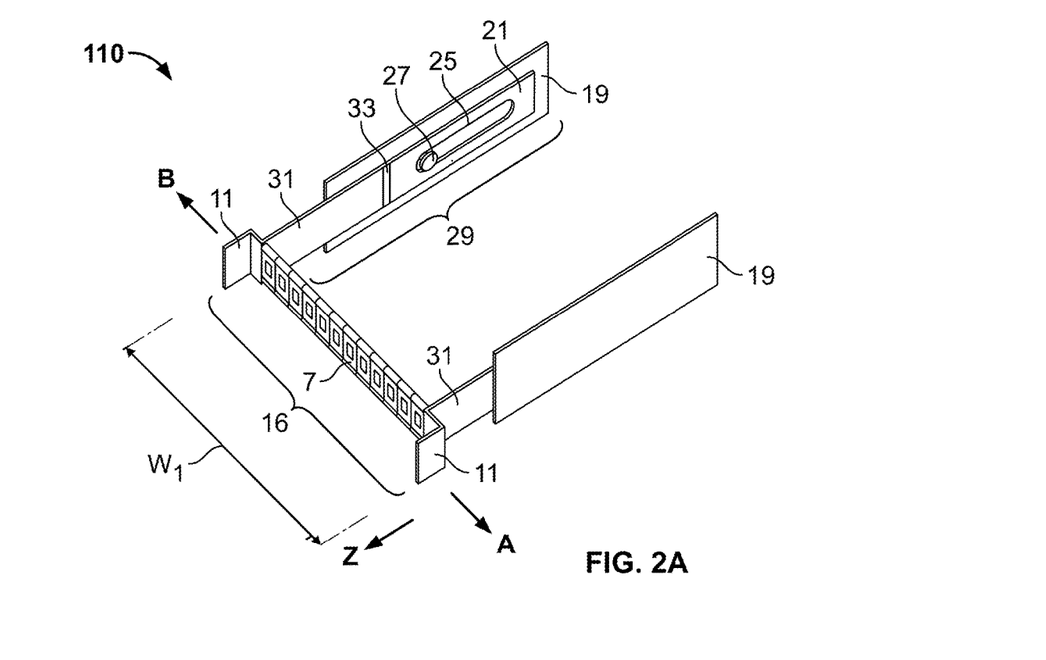
FIG. 2A is one of the patch panel devices of FIG. 1A shown in a first state.
Figure 2B:
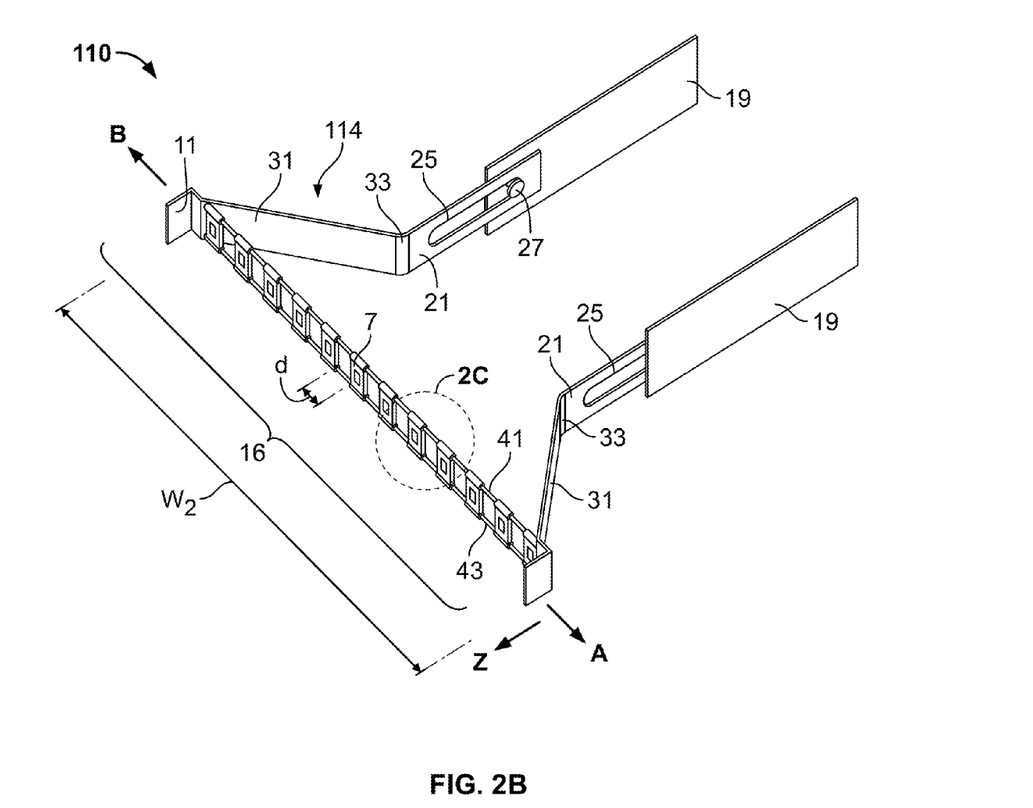
FIG. 2B is the patch panel device of FIG. 2A shown in a second state.
Figure 2C:
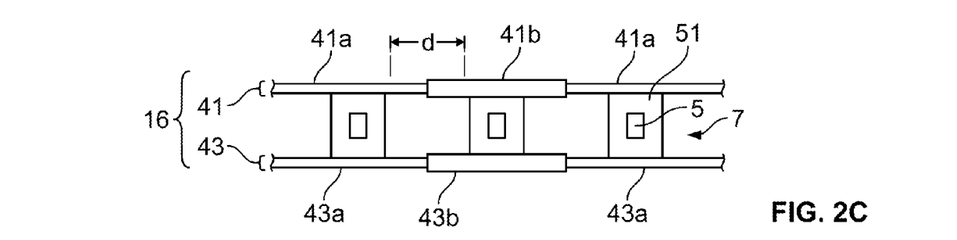
FIG. 2C is an enlarged view of the indicated area of FIG. 2B.

The patch panel device 110 may be transitionable between first and second states, as shown best in FIGS. 2A and 2B respectively. The patch panel device 110 may include bars 19, which facilitate mounting of the patch panel device within the housing 2 by securing one of the bars 19 on each of opposite sides 2a of the housing 2. A hinged arm member 114, which includes a first arm section 21 and a second arm section 31, may be slidably connected to the bar 19. The first arm section 21 may include a slot 25 which is configured and adapted to receive a pin 27 therethrough. The pin 27 may secure the first arm section 21 to the bar 19 while permitting the first arm section 21 to slide relative to the bar 19 along the length of slot 25. The first arm section 21 and the second arm section 31 of the hinged arm 114 may be pivotably connected to one another by a hinge 33, thereby facilitating the rotation of the second arm section 31 relative to the first arm section 21.

The ports 7 may be operably coupled to a connection means 16. As the connection means 16 transitions from a first length equal to width $W_1$ (FIG. 2A) to a second, expanded width $W_2$ (FIG. 2B), the ports 7 may move, or be moveable, to be positioned in a spaced apart relation. In an embodiment, the ports 7 are spaced apart. The ports 7 may be equidistantly spaced apart by equal gaps or spacing distances d. However, the spacing distances d between adjacent ports 7 may differ, i.e., be non-uniform, in the second state. In addition, individual ports 7 may be slid or moved along the length of the connection means 16, thereby facilitating adjustment of the gap or spacing distances d between adjacent ports 7 as desired by the user or technician.

It is contemplated that the hinged arm member 114 may include a lip (not shown) that interacts with a groove (not shown) defined within the bar 19 along a portion or substantially the entire length of the bar 19 to provide added stability and controlled movement of the hinged arm member 114 relative to the bar 19.

As shown best in FIG. 2C, the connection means 16 may include one or more telescopic rails 41, 43 that are slidable to adjust the overall length of the connection means 16. Although shown in FIG. 2C as having two parallel rails 41, 43, a single rail may be used. It should be noted that the greater the overall length of the connection means 16, the greater the gap or spacing distance d achievable between adjacent ports 7. Each of the parallel rails 41, 43 may include alternating sections 41a, 41b and 43a, 43b respectively. Sections 41a, 43a may be configured and adapted to slide within sections 41b, 43b respectively, where the ports 7 may be coupled to the sections 41b, 43b, to effect lengthening or shortening of the connections means 16. A resilient or biasing member (not shown) may be placed within a hollowed out center of each of the rails 41, 43 to bias the connections means 16 to one of the first or second dimensions $W_1$, $W_2$, respectively.

The sections 41b, 43b may define an open circumference such that the ports 7 will not obstruct movement of the alternating sections 41a, 41b and 43a, 43b relative to one another such that the ports 7 may be moved in closer proximity to one another. In addition, the lengths of the alternating sections 41a, 41b and 43a, 43b may be selected to facilitate placement the ports 7 in close proximity to one another, such that adjacent ports contact each other. Each port 7 may be secured to the rails 41, 43 in a variety of ways or may be integrally formed with the rails 41, 43. It is contemplated that in other embodiments, the rails 41, 43 may be substituted with different connection means. In an embodiment, the rails 41, 43 may be substituted with elastic bands. A variety of other configurations may be used to effect lateral, angular, or other spacing between ports in a patch panel device to increase access to the ports, such as those described in greater detail in U.S. Provisional Patent Applications No. 61/828,358 and 61/859,987.

For example, another embodiment of a patch panel device is described with reference to FIGS. 3A-3D. A patch panel device 210 may include a plurality of attachment members 232 that are positioned adjacent to one another. Each attachment member 232 may include a movable member 246, which is rotatable or pivotable relative to a movable member of another attachment member 232. The movable members 246 of adjacent members 232 may be operatively coupled to one another to permit rotation of one of the movable members 246 relative to the other movable member. In an embodiment, the movable members 246 may be coupled to one another in a snap-fit connection that permits radial movement of the movable members 246 relative to one another. At least two securement members 244 may be secured to opposing ends of the plurality of attachment members 232 and secure the attachment members 232 to a tray 231. In another embodiment, a securement member 244 may be positioned between each of the movable members 246. Each of the movable members 246 may be operatively coupled to one or more cables C1, which are shown only in part. The movable member 246 may include a cable adapter or connector 249, which may include a front surface 249a that may be operatively coupled to one cable C1 and a back surface 249b that may be operatively coupled to another cable C1. The movable member 246 may include a receptacle 247 in which the connector 249 may be releasably secured such that the connector 249 may be separated from the attachment member 232.

Figure 3A:
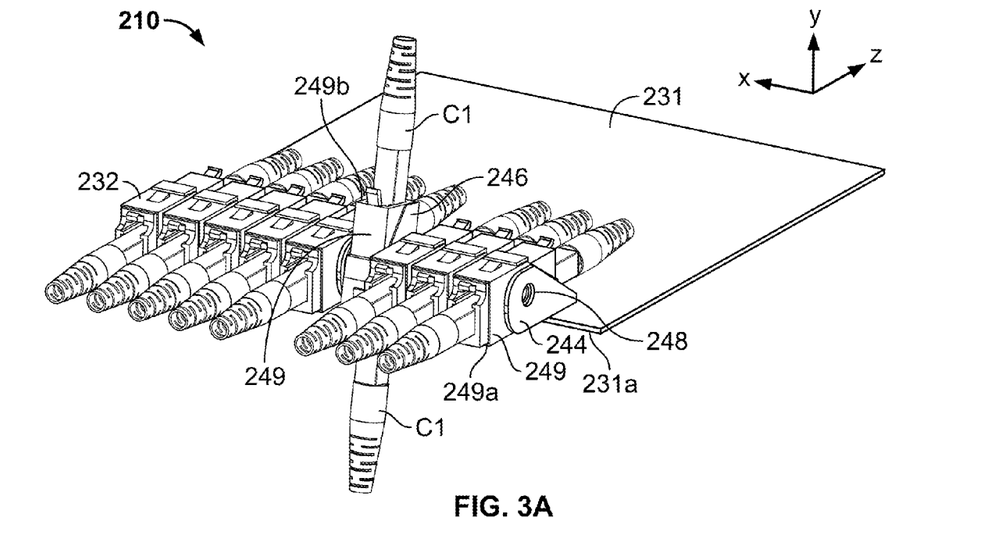
FIG. 3A is a perspective view of another embodiment of a patch panel device including a plurality of attachment members.

The movable members 246 may be positioned spaced a distance from an edge 231a of the tray 231 to permit the movable members 246 to rotate relative to the tray 231. In one embodiment, the tray 231 may include a cut-out (not shown) at the movable members 246 to facilitate a range of movement of the movable members 246 relative to the tray 231. The tray 231 may have an axis z extending along its length, an axis y extending along its height, and an axis x extending along its width. The securement member 244 may be coaxially aligned with the axis z extending along the length of the tray 231. A plurality of securement members 244 may be positioned in a row extending along axis x along the width of the tray 231.

Figure 3B:
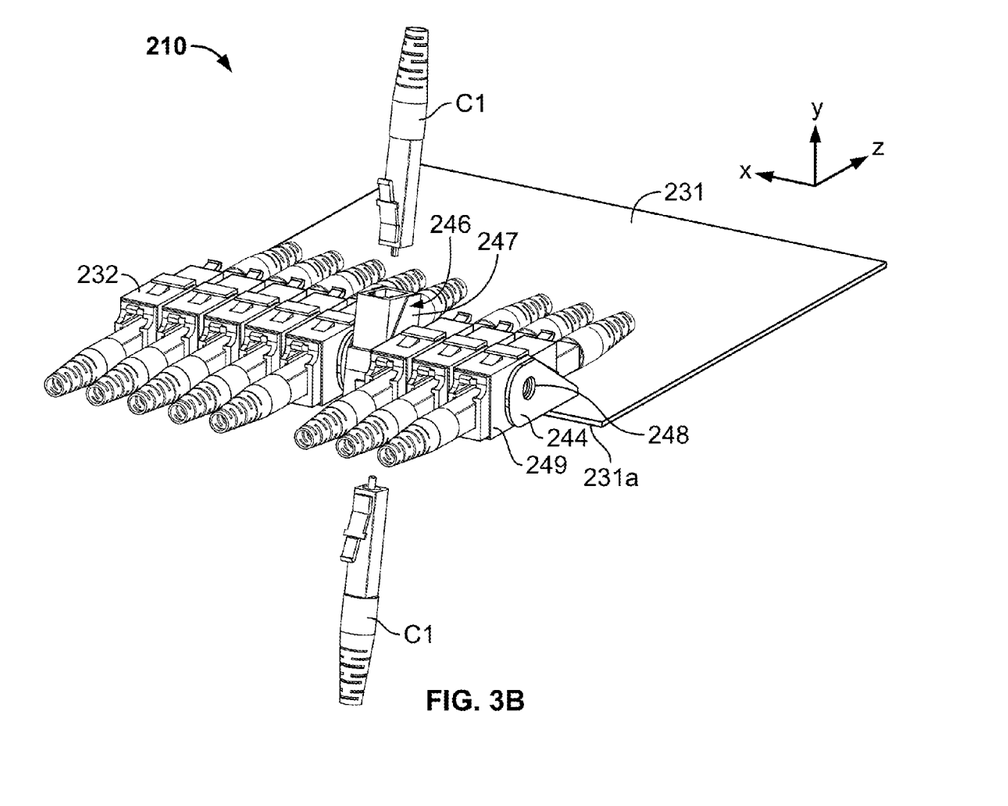
FIG. 3B is a perspective view of the patch panel device of FIG. 3A in which cables have been separated from one of the attachment members.
Figure 3C:
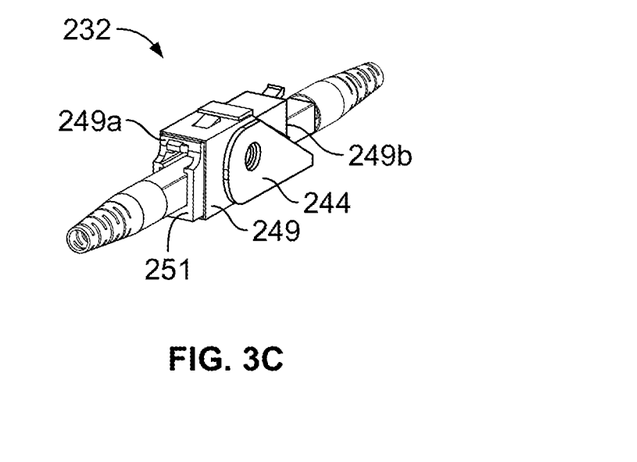
FIG. 3C is a perspective view of one of the attachment members of FIG. 3A shown in a first condition.
Figure 3D:
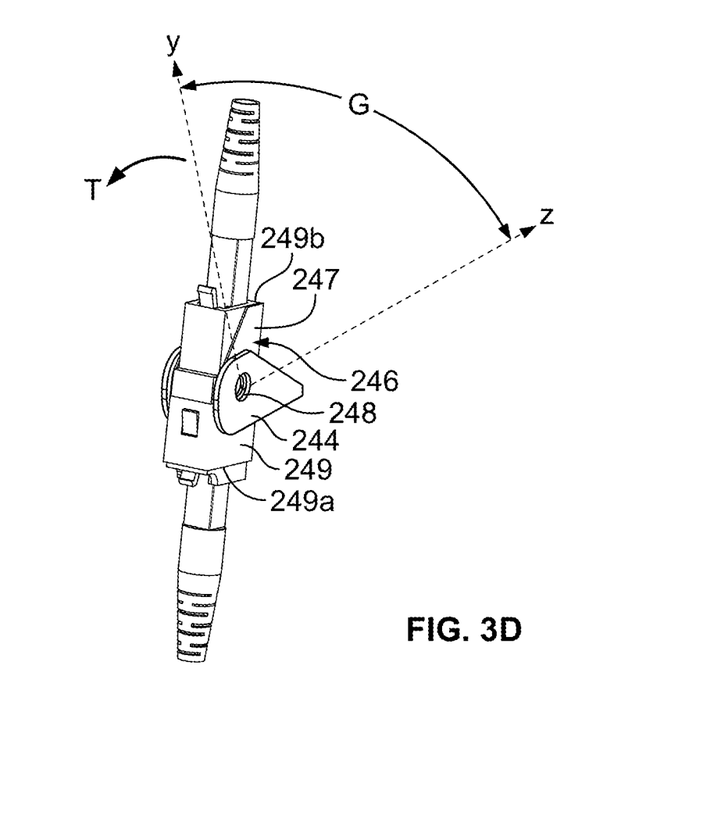
FIG. 3D is a perspective view of one of the attachment members of FIG. 3A shown in a second condition.

As shown in FIGS. 3C-3D, the securement member 244 and a movable member 246 of the attachment member 232 may be pivotably connected to one another at a pivot point 248 such that the movable member 246 may be radially moved relative to the securement member 244 to define an angle G therebetween. In particular, the movable member 246 may radially pivot between the y and z axes and the angle G may be defined therebetween. When secured to the tray 231, the movable member 246 may pivot in a counter-clockwise direction T, but may be inhibited from pivoting in the opposite, clockwise direction by the tray 231. However, as discussed above, cut-outs in the tray 231 may reduce the interaction between the tray 231 and the movable member 246 to facilitate a greater range of movement of the movable member 246 with respect to the tray 231. In an embodiment, the angle G may be adjusted within a range between about 0 and about 135 degrees. In another embodiment, the angle G may be adjusted within a range between about 0 and about 90 degrees. For example, in one embodiment, the movable members 246 may be movable relative to one another to transition the patch panel device 210 between a first condition in which front surfaces 251 of the movable members 246 are substantially coplanar, and adjacent ones of the members 246 are spaced apart a first distance or contact each other, and a second condition in which the front surfaces 251 of respective adjacent members 246 are in different planes in accordance with the angle G that one of the adjacent members 246 is pivoted or rotated relative to the other adjacent members 246, where the other member 246 may or may not be at the same position as in the first condition.

A plurality of patch panel devices 210 may also be supported within housing 2 (see FIGS. 1A-C), and may be translatable into or out from the housing 2 in a direction along axis z. Once spaced apart from the housing 2, the movable member 246 may be pivoted with respect to the securement member 244, thereby spacing the surfaces 249a, 249b of the connector 249 from any adjacent connector 249 such that the cables C1 may be more accessible and readily grasped by a user to detach the cable C1 from the cable adapter or connector 249 of the movable member 246 (as shown in FIG. 3B).

A further embodiment of a patch panel device is described with reference to FIGS. 4A-F. A patch panel device 310 may include a plurality of attachment members 332 positioned adjacent one another and attached respectively to arms 306. Each arm 306 may be operatively coupled in a pivotable relationship with a tray 331, to allow a corresponding attachment member 332 to be rotated or pivoted away from an adjacent attachment member 332 so as to separate adjacent attachment members 332 from each other. Attachment members 332 may take different forms, such as one similar or identical to attachment members 232 described in connection with FIGS. 3C-D.

The tray 331 may include a pivot region 360 between a proximal portion 331a and a distal portion 331b of the tray. The arms 306 may be pivotably attached to the distal portion 331b, such that the attachment members 332 overlie an opening 362 in the proximal portion 331a of the tray 331, as best illustrated in FIGS. 4D-F. The pivot region 360 may allow the proximal portion 331a of the tray 331 to fold downwardly, away from the arms 306 and the distal portion 331b of the tray 331. The tray 331 may terminate at an upward-facing proximal lip 364 at the proximal end of the proximal portion 331a. The length of the tray 331 from the distal end of the distal portion 331b to the proximal end of the proximal portion 331a may be configured such that the attachment members 332 are positioned between the pivot region 360 and the proximal lip 364. The lip 364 may permit an operator or user to pull the patch panel device 310 proximally out of a housing (such as the housing 2 of FIG. 1A), and also retain portions of the cables connected at the ends of the ports 407 within the housing 2.

Figure 4A:
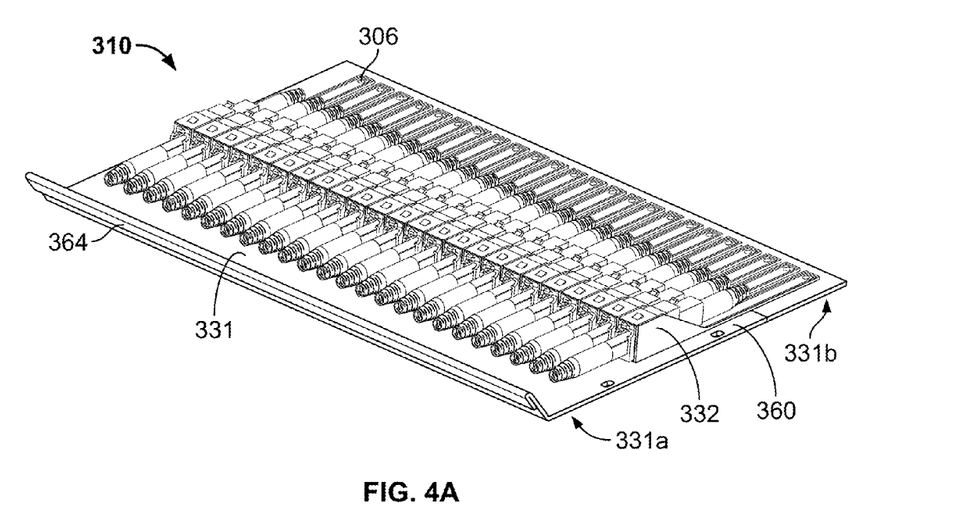
FIG. 4A is a perspective view of a patch panel device in another embodiment.
Figure 4B:
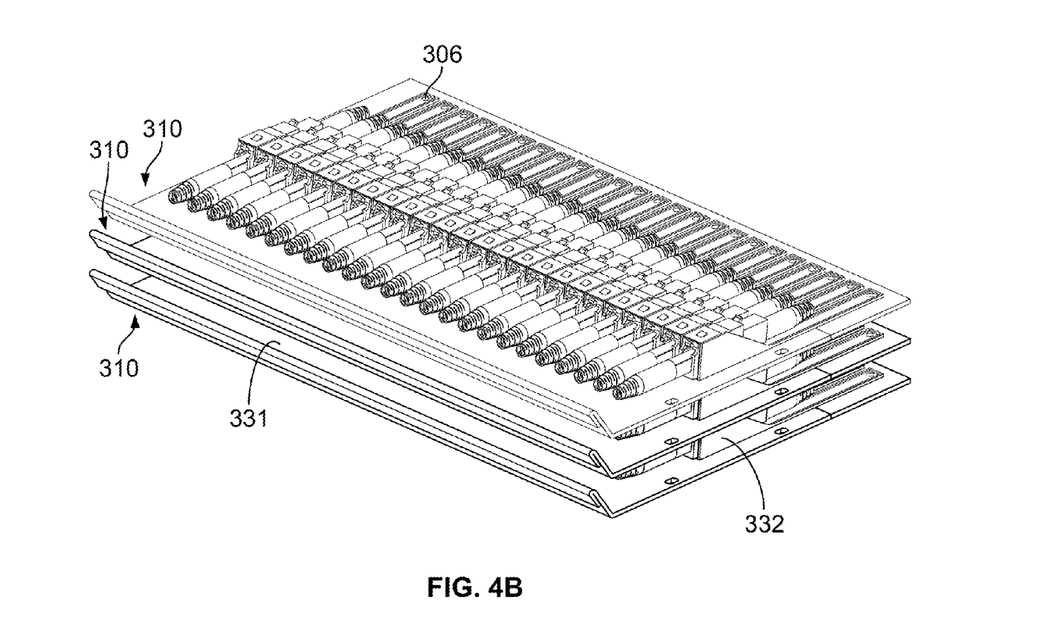
FIG. 4B is a perspective of a stack of the patch panel devices of FIG. 4A in a first state.
Figure 4C:
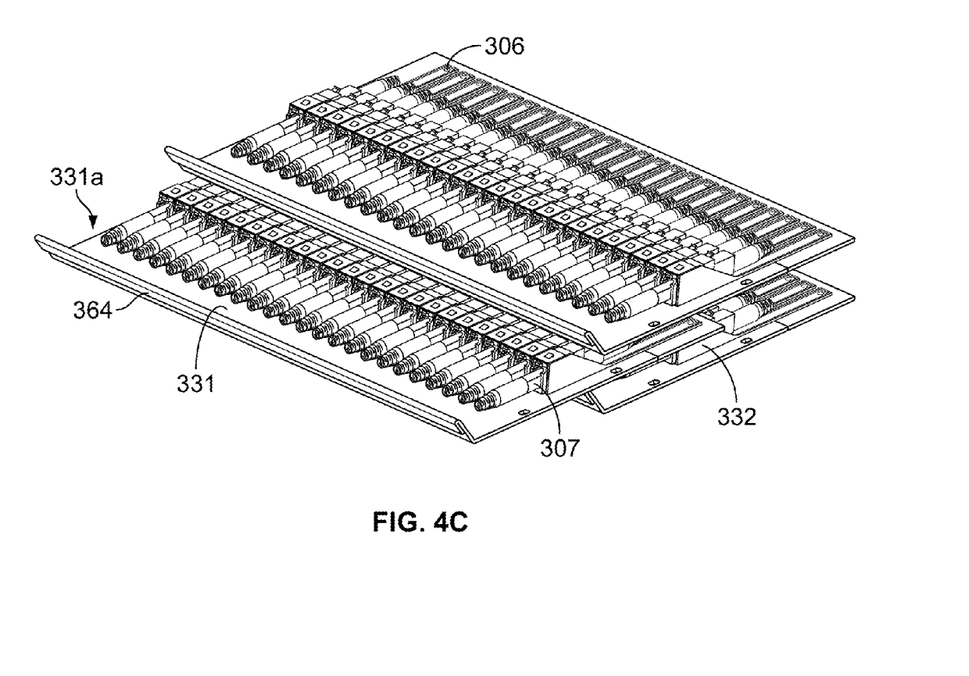
FIG. 4C is a perspective of the stack of the patch panel devices of FIG. 4A with one of the devices in a second, pulled out state.
Figure 4D:
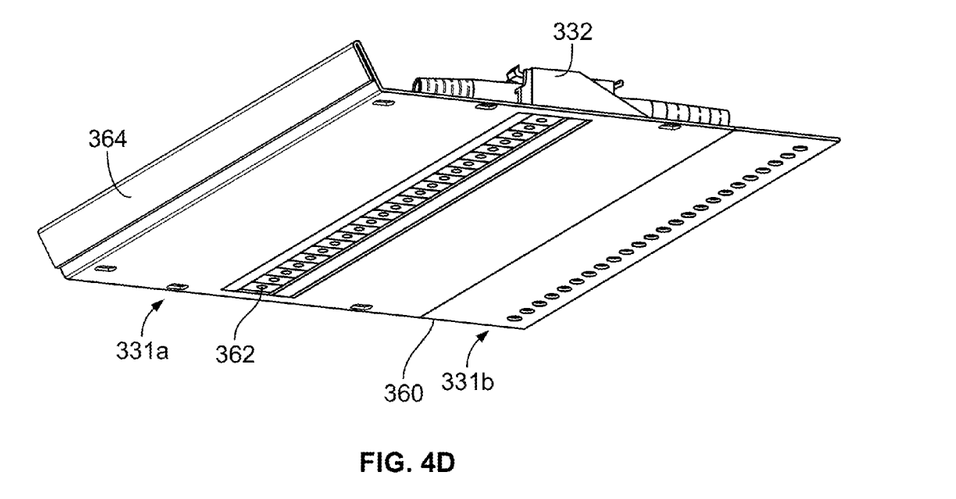
FIG. 4D is a bottom perspective view of the device of FIG. 4A without an underlying plate.
Figure 4E:
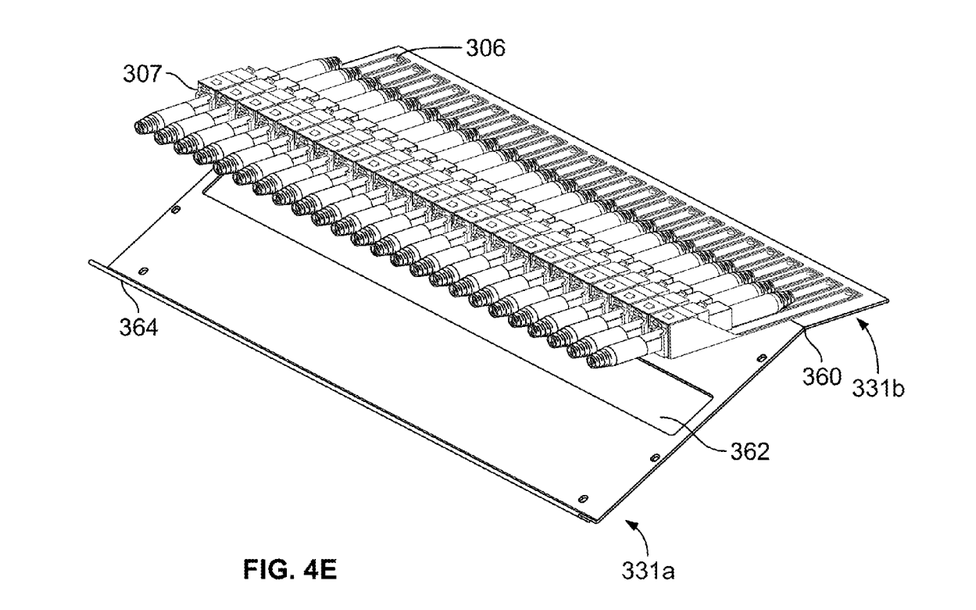
FIG. 4E is a perspective of the device of FIG. 4A with a proximal portion of the tray rotated away from the attachment members which are arranged in a first state.
Figure 4F:
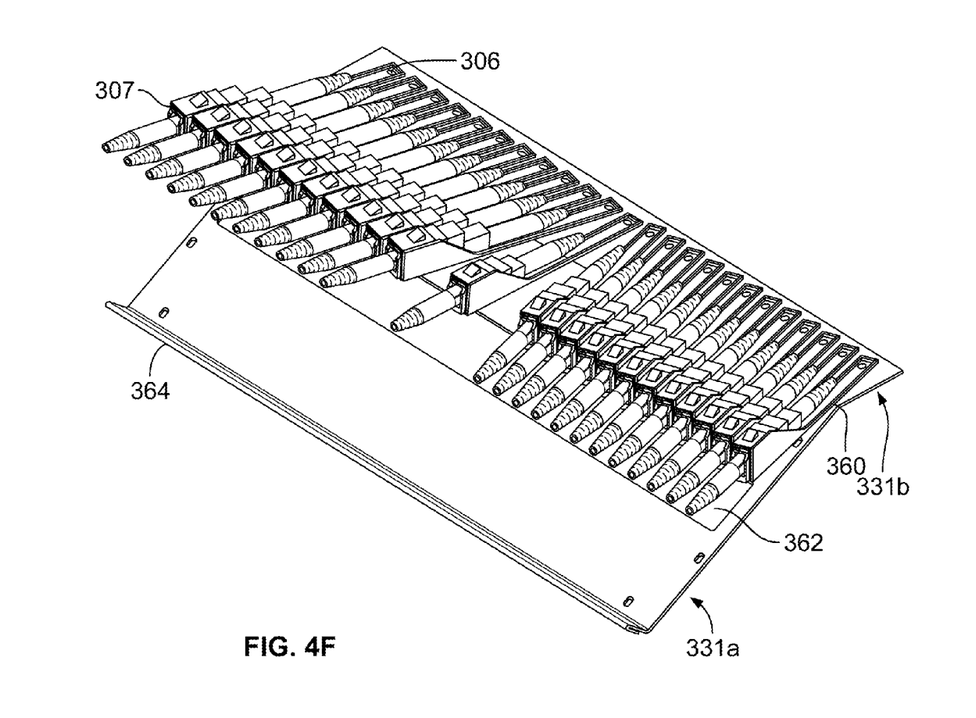
FIG. 4F is a view of the device similar to that shown in FIG. 4E with the attachment members arranged in a second state.

Referring to FIGS. 4C and 4E-F, when the tray 331 is pulled away from the housing 2, the proximal portion 331a may be folded, bent, pivoted, or otherwise transitioned downwardly, away from the arms 306, so that the proximal lip 364 does not obstruct access to the proximal ends of the ports 307 of attachment members 332.

Referring to FIGS. 4G-M, a sheet or plate 366 may be attached to or otherwise disposed on the underside surface of the tray 331. The plate 366 may be formed of a material having a thickness and flexibility to permit the plate 366 to be bent at a portion adjacent the pivot region 360 of the tray 331. For example, the material may be stainless steel having a thickness of between about 50 and about 500 microns, although other materials and thicknesses may be appropriate. The plate 366 may extend from the proximal end of the tray 331 to the distal end of the tray 331, terminating in an upward-facing distal lip 368 at a distal end thereof and terminating in an upward-facing proximal lip 370 at a proximal end 373 thereof. The bottom surface of the plate 366 (i.e., the surface facing away from tray 331) is preferably smooth.

Figure 4G:
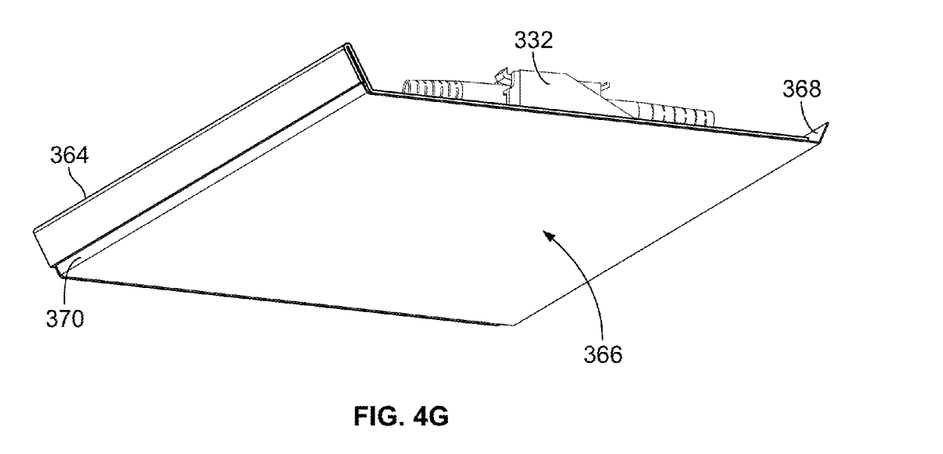
FIG. 4G is a bottom perspective view of the device of FIG. 4A with the underlying plate.

The plate 366 may provide that, when the attachment members 332 protrude through the opening 362 in the tray 331, any protruding portion of the attachment members 332 beneath the tray 331 is covered by the sheet 366. As such, the plate 366 prevents contact of the protruding portions with a component of an adjacent lower patch panel device 310 when such devices are arranged vertically in a stack. For example, if such contact were to occur as one of the patch panel devices 310 is moved proximally relative to a lower adjacent patch panel device, the sliding motion may stop abruptly, become difficult, damage components that contact one another, or unintentionally cause the adjacent lower patch panel device to also slide proximally.

In certain embodiments, the lips 368 and 370 may extend away from an intermediate portion 372 of the plate 366 at angles greater than about 90 degrees. For example, the distal plate lip 368 and the proximal plate lip 370 may each extend in the range of between about 120 to 150 degrees in relation to intermediate plate portion 372 when the plate 366 is in an unbent condition. The disposition of the distal plate lip 368 and the proximal plate lip 370 angled relative to the intermediate portion 372 may allow the tray 331 in combination with the plate 366 to slide with ease relative to other similarly configured trays 331 of patch panel devices 310 arranged vertically adjacent thereto, as described below. Additionally, one or both of the plate lips 368, 370 may be joined to the intermediate portion 372 of plate 366 to form a rounded or filleted corner region having a radius of curvature between about 3 mm and about 15 mm. It should be understood that the radius of curvature may vary from the above dimensions, and may be entirely omitted such that one or both of the plate lips 368, 370 form a sharp angle with intermediate plate 366. For example, the proximal lip 370 of the plate 366 may form any angle between approximately 90 degrees and approximately 180 degrees with the underside of the plate 366. The proximal tray lip 364 may similarly be joined to the proximal portion 331a.

Figure 4H:
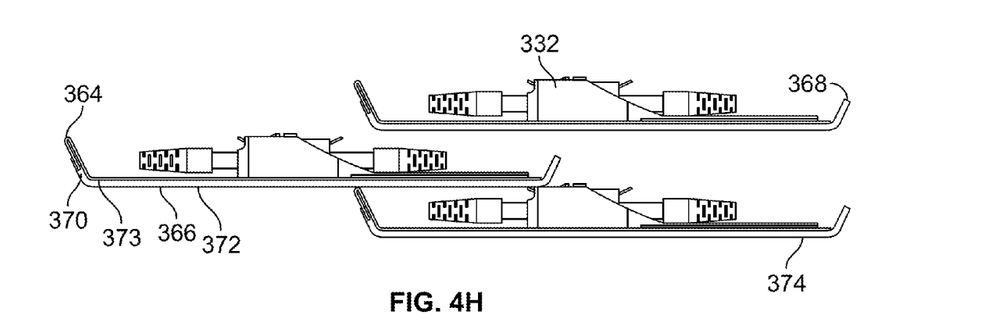
FIG. 4H is a cross-sectional view of the stack of the devices of FIG. 4C with the underlying plates.
Figure 4I:
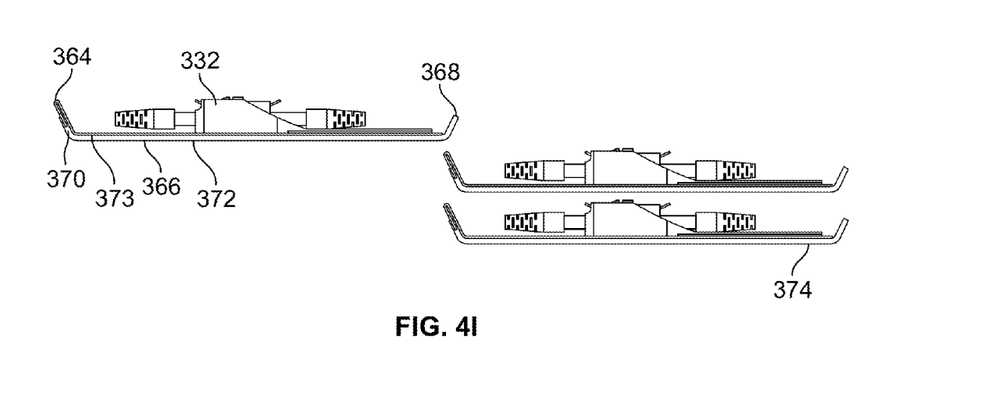
FIG. 4I is a cross-sectional view of the stack of devices of FIG. 4H in a different pulled out state.
Figure 4J:
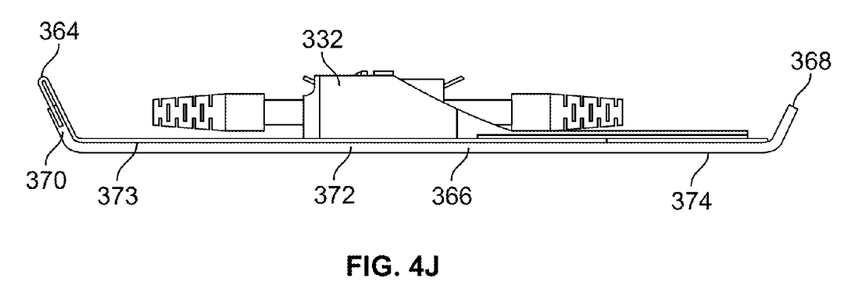
FIG. 4J is a cross-sectional view of the device as shown in FIG. 4A with the underlying plate.
Figure 4K:
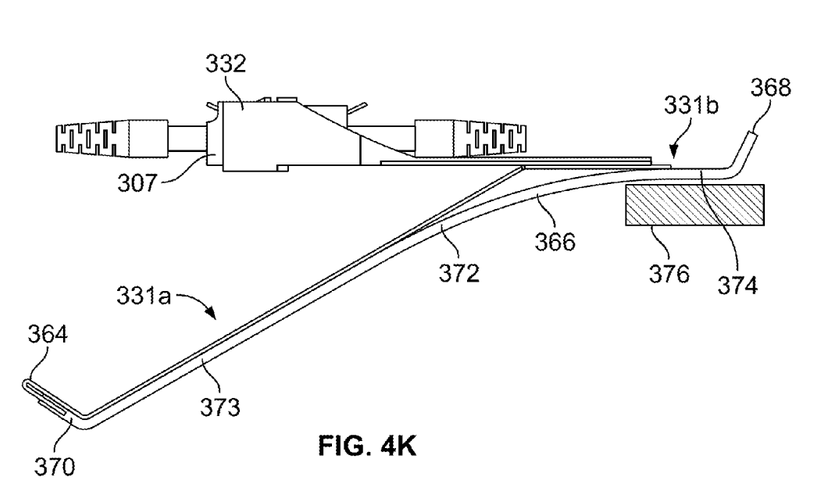
FIG. 4K is a cross-sectional view of the device as shown in FIG. 4A with the underlying plate and with a proximal portion of the tray and the plate rotated away from the attachment members which are arranged in a first state.

The plate 366 may be fixed, such as by adhesive, welding, or other suitable means, to the tray 331 only at the proximal region 373 and/or intermediate region 372, between the pivot region 360 and the lip 364 of the tray 331. A distal portion 374 of the plate, which may overlie a support member 376 of a housing, as shown in FIG. 4K, or a portion of an underlying patch panel device 310 when the device 310 is arranged vertically in a stack of the patch panel devices 310 in a housing, may be left unfixed to the tray 331. Such attachment configuration of the plate 366 to the tray 331 may provide that, when the intermediate portion 372 and proximal portion 373 of the plate 366 is bent downward along with the proximal portion 331a of the tray 331, as shown in FIG. 4K, the distal portion 331b of the tray 331 may slide proximally away from the distal plate lip 368 and along the distal portion 374 of the plate, which may be supported on the member 376 or an underlying device 310. This configuration may also facilitate the plate 366 in bending without kinks, bumps, or the like being formed in the plate 366. In other words, the plate 366 may bend without causing the smooth characteristic of the outer surface of the plate 366 to change, such that the outer surface does not permanently becomes less smooth after the plate 366 is bent.

Figure 4L:
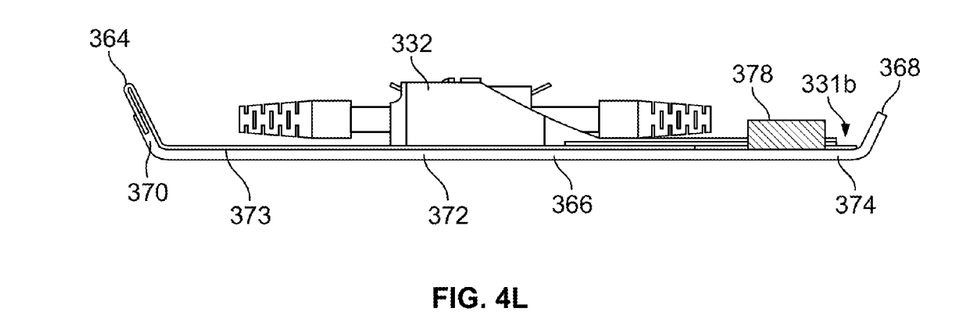
FIG. 4L is a cross-sectional view of an alternative embodiment of a patch panel device with an underlying plate.

Alternatively, as shown in FIG. 4L, the distal portion 331b of the tray 331 may be slidably engaged with the distal portion 374 of the plate 366 by a guide 378 extending from and disposed at the distal portion 374 of the plate 366.

Figure 4M:
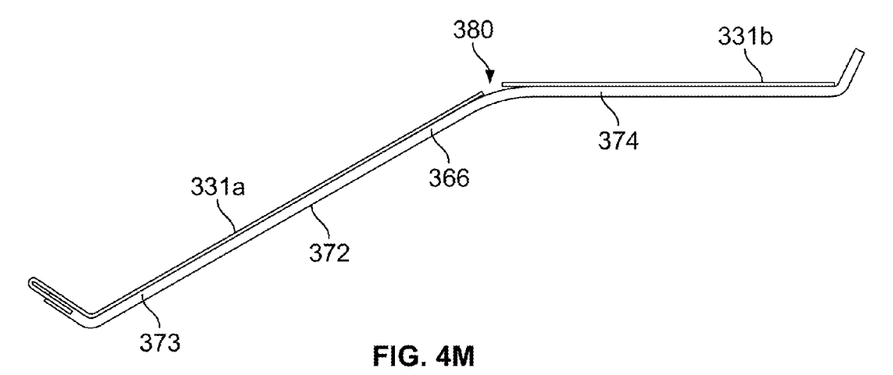
FIG. 4M is a cross-sectional view of another alternative embodiment of a patch panel device with an underlying plate.

In a further embodiment, as shown in FIG. 4M, both the proximal and distal portions 331a, 331b of the tray 331 may be detachable from one another and fixed to the respective intermediate and distal portions 372, 374 of the plate 366, such as by adhesive, welding, or other suitable means. In an exemplary operation, the plate 366 may bend at a portion adjacent the facing ends respectively of the proximal and distal portions 331a, 331b of the tray 331, operating essentially as a hinge 380. In other words, the tray 331 may form at least two discrete portions, such as proximal portion 331a that is noncontinuous with distal portion 331b and not directly connected to distal portion 331b.

The plate 366 having a smooth outer surface may be advantageous because, when the patch panel devices 310 are arranged vertically, such as in a stack as shown in FIGS. 4B, 4C, 4H and 4I, the tray 331 of such device 310 may move smoothly into and out of the stack (and/or housing 2). Specifically, referring to FIG. 4H, the lips 368, 370 associated with the plate 366 of a patch panel device 310 in the stack may avoid obstruction to movement that may be caused by a portion of a device 310 directly below. The smooth outer surface may allow the device 310 to slide over the below device 310 with minimal obstruction being caused by projecting portions from the below device 310, which may be part of the tray 331 or the attachment means of the below device 310, for example. Additionally, because the outer surface extends to proximal lip 370 and distal lip 368, both the proximal and distal lips 370, 368 may provide the same or similar functions. The angle of the proximal and distal lips 370, 368 with respect to the intermediate portion 372 combined with the smooth surface may allow the lips of the plate to facilitate smooth movement over a component that projects from an underlying patch panel device 310, along the outer surface of the lip to, and then along, the outer surface of the intermediate portion 372 of the immediately adjacent overlying device 310. For example, when a patch panel device 310 is pulled from the stack, the proximal lip 370 thereof may smoothly move over any obstruction abutting from the device 310 below (e.g., the top of the tray's proximal lip 364, upper portions of the attachment means 332, cables, connectors, etc.).

The distal lip 368 performs a similar function with respect to the tray below when the device 310 is pushed back so as to be disposed in vertical alignment with the stack. In addition, the proximal lip 370 associated with a patch panel device 310, which may be positioned within the housing 2, may provide for smooth movement into the housing 2 of an immediately underlying patch panel device 310, such as by providing that the attachment means 332 of the underlying device 310 may move smoothly along the outer surfaces of the lip 370 and the intermediate portion 372 of the overlying device 310.

In other embodiments, the plate 366 need not form lips on each side thereof. For example, proximal lip 364 of tray 331 may be formed with curvature similar to that described above in relation to proximal lip 370 of the plate 366. Similarly, a distal lip (not illustrated) may be formed on the distal portion 331b of tray 331 similar to distal tip 368 of plate 366. This may be done with or without the distal tip 368 of the plate 366. In these embodiments, it may be preferable that plate 366 is formed and coupled to tray 331 so that there is a smooth continuity between a proximal (or distal) end of plate 366 and the corresponding proximal lip 364 (or distal lip) of the tray 331. By maximizing this continuity, it may be less likely that components of a patch panel device immediately underlying the patch panel device 310 will catch or otherwise interrupt the movement of the patch panel device 310 due to any discontinuity between the tray 331 and the plate 366. In these embodiments, the plate 366 may still be attached to a bottom surface of tray 331 to facilitate smooth sliding of one patch panel device 310 with respect to an adjacent device in a vertical stack.

In one embodiment, if the tray is provided with a proximal lip 364 and/or a distal lip (not shown) without rounded edges, plate 366 may be attached to the underside of tray 331 without the plate 366 having any lips. For example, if the proximal lip 364 of tray 331 has a sharp angle with tray 331, the proximal end of plate 366 may be provided with a same or similar angle and be positioned with respect to proximal lip 364 so that there is a substantially continuous transition between proximal lip 364 and the underside of plate 366. The same may be true of a distal lip of the tray 331, if provided.

It may be unnecessary to provide any distal lip, either on the tray 331 or plate 366, depending on the range of sliding motion of tray 331 and plate 366. For example, tray 331 and plate 366 may be limited so that they may slide a relatively short distance. In particular, the sliding distance may be limited so that the distal end of tray 331 and/or plate 366 may never slide beyond a particular "catch point" on a lower patch panel device. In this case, the distal ends of tray 331 and plate 366 may never have occasion to need a lip to facilitate smooth movement over such a catch point.

In any of the embodiments described herein, it is to be understood that any suitable connector may be used. For example, an LC type connector may be used. However, an LC connector is only one example of a small form connector that may be used. Differently sized connectors, whether larger or smaller may be used. As discussed above, connectors may be configured to be coupled to one or more cables, e.g., simplex or duplex. Specific connectors shown and described herein are merely illustrative embodiments. Connectors that are differently configured and/or sized may be utilized without deviating from the scope and spirit of the present invention.

Although the invention herein has been described with reference to particular embodiments, it is to be understood that these embodiments are merely illustrative of the principles and applications of the present invention. It is to be understood unless otherwise indicated herein that the figures are not intended to be to scale. It is therefore to be understood that numerous modifications may be made to the illustrative embodiments and that other arrangements may be devised without departing from the spirit and scope of the present invention as defined by the appended paragraphs.

The invention claimed is:
1. A communication patch panel device comprising:
   a tray assembly having a proximal portion, a distal portion, and a pivot region between the proximal portion and the distal portion;

a plurality of arms, each arm having a first end attached to the distal portion of the tray assembly and a second end; and a plurality of attachment members coupled to the plurality of arms, each attachment member configured to attach to a cable;

wherein the proximal portion of the tray assembly is adapted to pivot about the pivot region from a non-pivoted condition to a pivoted condition, the plurality of arms being positioned over the proximal portion of the tray assembly in the pivoted and non-pivoted conditions, the proximal portion of the tray adapted to move away from the plurality of arms as the proximal portion of the tray assembly transitions from the non-pivoted condition to the pivoted condition.

2. The device of claim 1, wherein the first end of each arm is pivotably attached to the distal portion of the tray assembly so that each arm is operable to be pivoted laterally toward and away from another arm of the plurality of arms.

3. The device of claim 1, wherein the proximal portion of the tray assembly is coupled to the distal portion of the tray assembly.

4. The device of claim 1, wherein a proximal lip is positioned at a proximal end of the proximal portion of the tray assembly and extends at an angle away from the tray assembly.

5. The device of claim 4, wherein the attachment members are positioned between the pivot region and the proximal lip when the tray assembly is in the non-pivoted condition.

6. The device of claim 4, wherein the proximal lip is integrally formed on the proximal portion of the tray assembly.

7. The device of claim 1, wherein each attachment member is rotatable with respect to a corresponding arm to which the attachment member is coupled.

8. The device of claim 1, wherein in the non-pivoted condition, a surface of the proximal portion of the tray assembly is spaced apart from the plurality of arms a first distance and a surface of the distal portion of the tray assembly is spaced apart from the plurality of arms a second distance equal to the first distance.

9. The device of claim 8, wherein in the pivoted condition, the surface of the proximal portion of the tray assembly is spaced apart from the plurality of arms a third distance greater than the first distance and the distal portion of the tray assembly is spaced apart from the plurality of arms the second distance.

10. A communication patching system comprising:
a housing adapted to receive a plurality of patch panel devices in a vertically stacked arrangement; and
a plurality of patch panel devices, each patch panel device including:
  a tray assembly having a proximal portion, a distal portion, and a pivot region between the proximal portion and the distal portion;
  a plurality of arms, each arm having a first end attached to the distal portion of the tray assembly and a second end; and
  a plurality of attachment members coupled to the plurality of arms, each attachment member configured to attach to a cable;
  wherein the proximal portion of the tray assembly is adapted to pivot about the pivot region from a non-pivoted condition to a pivoted condition, the plurality of arms being positioned over the proximal portion of the tray assembly in the pivoted and non-pivoted conditions, the proximal portion of the tray adapted to move away from the plurality of arms as the proximal portion of the tray assembly transitions from the non-pivoted condition to the pivoted condition.

11. The system of claim 10, wherein each patch panel device has an installed condition in which the patch panel device is substantially completely within the housing and a pulled out condition in which the patch panel device extends out of the housing.

12. The system of claim 11, wherein the proximal portion of the tray assembly is prohibited from pivoting about the pivot region when the patch panel device is in the installed condition.

13. The system of claim 10, wherein the first end of each arm is pivotably attached to the distal portion of the tray assembly so that each arm is operable to be pivoted laterally toward and away from another arm of the plurality of arms.

14. The device of claim 10, wherein the proximal portion of the tray assembly is coupled to the distal portion of the tray assembly.

15. The device of claim 10, wherein a proximal lip is positioned at a proximal end of the proximal portion of the tray assembly and extends at an angle away from the tray assembly.

16. The device of claim 15, wherein the attachment members are positioned between the pivot region and the proximal lip when the tray assembly is in the non-pivoted condition.

17. The device of claim 15, wherein the proximal lip is integrally formed on the proximal portion of the tray assembly.

18. The device of claim 10, wherein each attachment member is rotatable with respect to a corresponding arm to which the attachment member is coupled.

19. The device of claim 10, wherein in the non-pivoted condition, a surface of the proximal portion of the tray assembly is spaced apart from the plurality of arms a first distance and a surface of the distal portion of the tray assembly is spaced apart from the plurality of arms a second distance equal to the first distance.

20. The device of claim 19, wherein in the pivoted condition, the surface of the proximal portion of the tray assembly is spaced apart from the plurality of arms a third distance greater than the first distance and the distal portion of the tray assembly remains spaced apart from the plurality of arms the second distance.

* * * * *